(12) United States Patent
Ono

(10) Patent No.: US 9,126,632 B2
(45) Date of Patent: Sep. 8, 2015

(54) VEHICLE BODY TOP STRUCTURE

(75) Inventor: Tohru Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/241,143

(22) PCT Filed: Jun. 19, 2012

(86) PCT No.: PCT/JP2012/065594
§ 371 (c)(1),
(2), (4) Date: Feb. 26, 2014

(87) PCT Pub. No.: WO2013/031341
PCT Pub. Date: Mar. 7, 2013

(65) Prior Publication Data
US 2014/0225399 A1  Aug. 14, 2014

(30) Foreign Application Priority Data

Aug. 31, 2011  (JP) .................. 2011-189174

(51) Int. Cl.
*B62D 25/06* (2006.01)
*B62D 27/02* (2006.01)

(52) U.S. Cl.
CPC .............. *B62D 25/06* (2013.01); *B62D 27/023* (2013.01)

(58) Field of Classification Search
CPC .............................. B62D 25/06; B62D 27/203
USPC ................ 296/216.08, 203.03, 205, 210, 191
See application file for complete search history.

(56) References Cited

U.S. PATENT DOCUMENTS

| | | | |
|---|---|---|---|
| 7,819,466 B2 * | 10/2010 | Hirata et al. | 296/216.08 |
| 7,883,142 B2 * | 2/2011 | Hosaka et al. | 296/210 |
| 2010/0140982 A1 | 6/2010 | Hosaka et al. | |

FOREIGN PATENT DOCUMENTS

| | | |
|---|---|---|
| JP | 61-46285 | 3/1986 |
| JP | 64-44276 | 3/1989 |
| JP | 2009-040098 | 2/2009 |

* cited by examiner

*Primary Examiner* — Joseph D. Pape
*Assistant Examiner* — Dana Ivey
(74) *Attorney, Agent, or Firm* — Rankin, Hill & Clark LLP

(57) ABSTRACT

A vehicle body top structure for enhancing the rigidity and strength of the intersections of side rails and a front rail. The vehicle body top structure is provided with left and right side rails provided so as to extend in the front-and-rear direction at the top part of a vehicle body side part, and a front rail extending left and right, one end part of which is joined to the left side rail, and the other end of which is joined to the right side rail. Thin-plate parts having a smaller plate thickness than thick-plate parts and thick-plate parts are disclosed at the one end and the other end of the front rail. The thin-plate parts are each connected to the left and right side rails.

6 Claims, 10 Drawing Sheets

VEHICLE BODY TOP STRUCTURE

TECHNICAL FIELD

The present invention relates to a vehicle body upper structure including a vehicle side body and a roof coupled to the side body.

BACKGROUND ART

A vehicle body upper structure of that type includes left and right side bodies and a roof front rail joined to the side bodies. The front rail extends laterally and has opposing ends joined to roof side rails of the side bodies. Within each of the roof side rails to which the opposing ends of the front rail are joined, a stay is disposed vertically to increase a strength of the roof side rail, such that a force with which a roof panel is pressed against the roof side rail in performing a single-sided spot welding can be transmitted to the stay, as taught in patent literature 1 below.

The vehicle body upper structure has T-shaped intersections where the laterally extending front rail is joined at its opposing ends to the roof side rails. These intersections make a great contribution to the vehicle body rigidity affecting a NV (noise and vibration) performance of the vehicle body or protection of a passenger compartment (cabin) during roll-over of the vehicle. Recently, it is desired to enhance rigidity and strength of such intersections.

The stay of the vehicle body upper structure of patent literature 1, which is adapted to receive and deliver the pressing force of the roof panel exerted on the roof side rail in performing the single-side spot welding, contributes to the improvement in the NV performance or protection of the cabin during the roll-over of the vehicle. Meanwhile, the intersections of the vehicle body upper structure need to have a higher strength. To increase the strength of the intersections, it is thought that the front rail is required to be thick. However, when the thick front rail is joined to the roof side rail by single-sided spot welding, an insufficient weld penetration is formed in the thick front rail. As a result, the weld strength between the thick front rail and the roof side rail is undesirably low.

PRIOR ART LITERATURE

Patent Literature

Patent Literature 1: JP 2009-40098

SUMMARY OF INVENTION

Technical Problem

It is an object of the present invention is to provide a vehicle body upper structure designed to increase rigidity and strength of an intersection (T-shaped butt joint) where a side rail and a front rail is welded together with a sufficient weld penetration formed in the front rail even if the front rail is thick.

Solution to Problem

According to one aspect of the present invention, as defined in claim 1, there is provided a vehicle body upper structure comprising: left and right side rails disposed at upper parts of lateral sides of a vehicle body and extending longitudinally of the vehicle body; and a front rail extending laterally of the vehicle body and having one end joined to the left side rail and an opposite end joined to the right side rail, the front rail having a predetermined width extending longitudinally of the vehicle, wherein at least one of the one end and the opposite end of the front rail includes a thick plate portion and a thin plate portion smaller in thickness than the thick plate portion, the thick plate portion and the thin plate portion being arranged longitudinally of the vehicle body, the thin plate portion being coupled to at least one of the side rails.

Preferably, as defined in claim 2, the front rail comprises a plate-shaped front rail upper member having the one end and the opposite end, and a plate-shaped bracket coupled to the one end or the opposite end, the bracket being smaller in thickness than the front rail upper member. The one end or the opposite end has a cutout portion or through-hole formed to match the thin plate portion. The bracket overlaps the one end or the opposite end and includes an exposure portion exposed through the cutout portion or the through-hole. The thin plate portion is defined by the exposure portion. The front rail upper member includes a remaining portion where the cutout portion or the though-hole is not formed, the thick plate portion being formed by an overlap between the remaining portion and the bracket.

Preferably, as defined in claim 3, each of the side rails comprises a side rail inner member, a side rail stiffener coupled to an outside of the side rail inner member in an overlapping relationship therewith to define a closed cross-sectional shape, and a stay disposed between the side rail inner member and the side rail stiffener. The stay includes a stay upper portion, the stay upper portion and the thick plate portion being vertically arranged in an overlapping relationship with each other.

Preferably, as defined in claim 4, the front rail further comprises a front rail lower member disposed below the front rail upper member, the front rail upper member having a dimension extending laterally of the vehicle body, the front rail lower member having a dimension extending laterally of the vehicle body, the dimension of the front rail lower member being smaller than the dimension of the front rail upper member. The side rails include carrier portions protruding toward a center of a width of the vehicle body and extending longitudinally of the vehicle body, the carrier portions carrying the one end and the opposite end. The structure further comprises an extension protruding from each of the side rails toward the center of the width of the vehicle body more than each of the carrying portions, the front rail lower member having a lateral outer end portion carried on the extension such that the extension supports the front rail lower member. The bracket is disposed between and coupled to the extension and the front rail upper member in an overlapping relationship with the extension and the front rail upper member.

Preferably, as defined in claim 5, the thick plate portion is provided in plural, the plural thick plate portions being arranged longitudinally of the vehicle body, and the thin plate portion is provided in plural, the plural thin plate portions being arranged longitudinally of the vehicle body.

Preferably, as defined in claim 6, the front rail upper member includes an upper bead extending longitudinally of the front rail upper member, and the bracket includes a bracket bead extending along the upper bead, the bracket bead and the upper bead being arranged vertically in an overlapping relationship with each other.

Preferably, as defined in claim 7, the upper bead extends toward the thick plate portion.

Advantageous Effects of Invention

As defined in claim 1, the thin plate portion is so thin that the thin plate portion is welded to the side rail with a sufficient weld penetration. That is, when the thin plate portion is welded to the side rail in an overlapping relationship therewith by single-sided spot welding, an insufficient weld penetration can be prevented without reducing the weld strength between the thin plate portion and the side rail, unlike welding of the thick plate portion.

In addition, rigidity and strength of an intersection (T-shaped butt joint) where the side rail and the front rail intersect can be increased by the thick plate portion extending to and overlapping the side rail. As a result, a NV performance of the vehicle body and a roll-over performance (i.e., a cabin protection performance during a roll-over of the vehicle) can be improved.

As defined in claim 2, the front rail includes the front rail upper member having the cutout portion or the through-hole formed in each of the one end and the opposite end. The thick plate portion and the thin plate portion are easy to form because the thick plate portion and the thin plate portion are formed in a simple structure formed just by placing the bracket of thin steel plate on each of the one end and the opposite end and coupling the bracket to each of the one end and the opposite end. The thickness of each of the thick plate portion and the thin plate portion can be simply set.

The front rail upper member and the bracket overlap each other and are coupled together to form the thick plate portion. The thick plate portion defined by these two members coupled together extends to and overlaps the side rail such that the rigidity and strength of the intersection (T-shaped butt joint) of the side rail and the front rail is increased.

Regarding claim 3, the stay is arranged such that a downwardly-directed pressing force exerted by a spot gun on a vicinity of the thick plate portion to perform spot welding (single-sided spot welding) on the vicinity can be transmitted from the thick plate portion to the stay. That is, since the stay bears the downwardly-directed force pressing the one end and/or the opposite end having the thick plate portion, the side rail does not deform even when the relatively large pressing force is transmitted to the side rail. Thus, the single-sided spot wielding can be performed on an increased number of points to thereby firmly couple the side rail and the front rail together so as to increase the rigidity and strength of the intersection (T-shaped butt joint) of the side rail and the front rail.

As defined in claim 4, the bracket is disposed between the extension and the front rail upper member, and the bracket is coupled to the extension and the front rail upper member in an overlapping relationship with the extension and the front rail upper member, thereby increasing a coupling strength between the bracket and each of the extension and the front rail upper member. These three members overlap one another and are coupled together to form a "three-layered coupled part" having an increased rigidity and strength. As a result, the rigidity and strength of the intersection (T-shaped butt joint) of the side rail and the front rail can be increased.

As defined in claim 5, the thick plate portion is provided in plural and the plural thick plate portions are arranged longitudinally of the vehicle body. The thin plate portion is provided in plural and the plural thin plate portions are arranged longitudinally of the vehicle body. The thin plate portions have welds at which the one end and the opposite end of the front rail are welded to the side rail. These welds are arranged at predetermined intervals to increase coupling between the side rail and the front rail. The plural thick plate portions are arranged at predetermined intervals. That is to say, the thick plate portion is provided for increasing the rigidity and strength, and such a portion for increasing the rigidity and strength is provided in plural at the predetermined intervals. As a result, the coupling between the side rail and the front rail can be increased to thereby increase the rigidity and strength of the intersection (T-shaped butt joint) of the side rail and the front rail.

As defined in claim 6, the front rail upper member includes the upper bead extending longitudinally of the front rail upper member, and the bracket includes the bracket bead extending along the upper bead. The bracket bead and the upper bead are arranged vertically in an overlapping relationship with each other. Thus, it becomes possible to disperse a load into the bracket bead and increase the rigidity and strength of the front rail.

As defined in claim 7, since the upper bead extends toward the thick plate portion, a load can be smoothly transmitted from the upper bead to the thick plate portion, such that the load (stress) on the upper bead can be reduced by this smooth transmission of the load to the thick plate portion. As a result, the rigidity and strength of the front rail can be increased.

DESCRIPTION OF EMBODIMENTS

Certain preferred embodiments of the present invention are described below with reference to the accompanying drawings.

Embodiment 1

Figure 1:
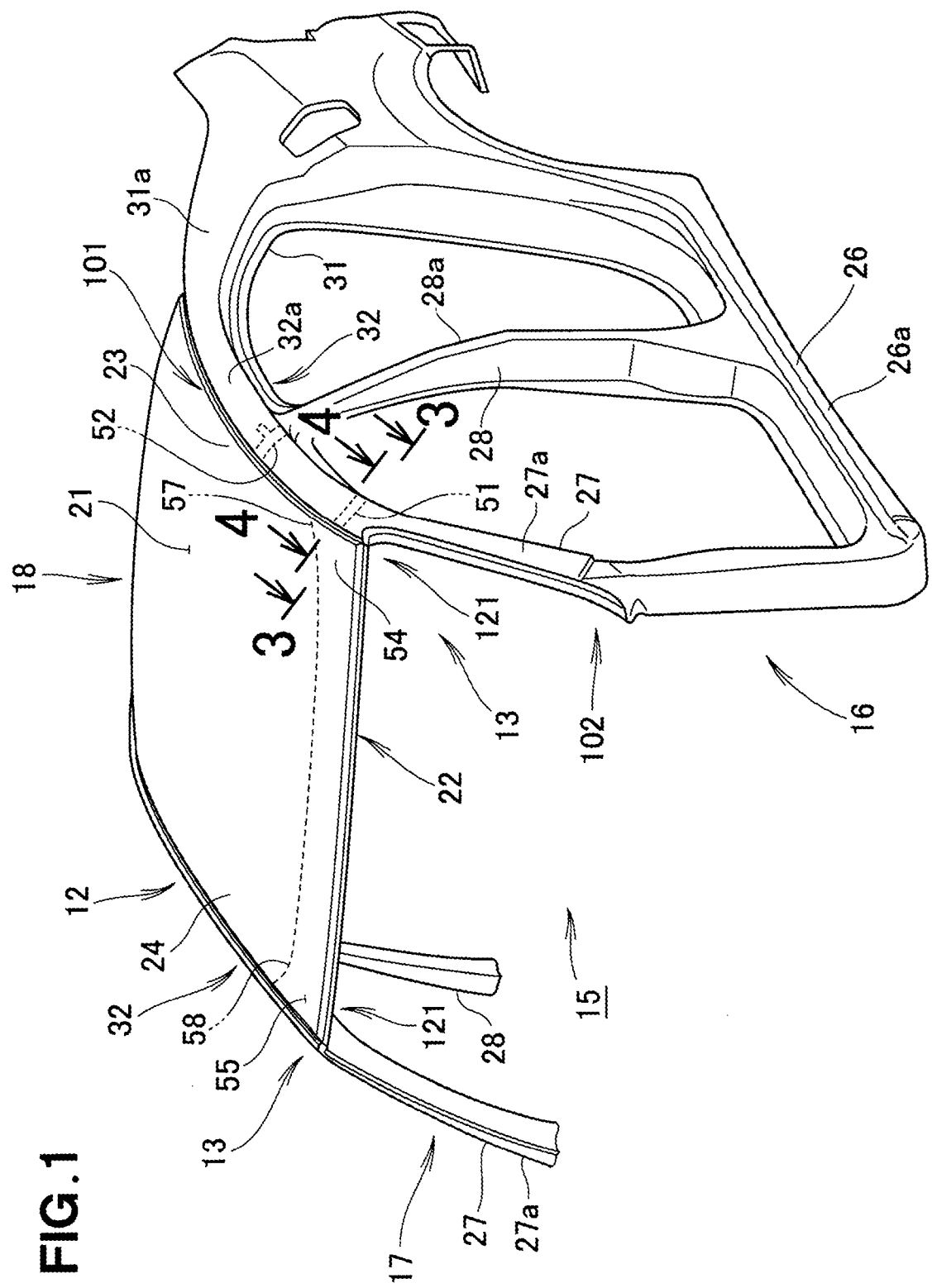
FIG. 1 is a perspective view of a vehicle including a vehicle body upper structure in a first embodiment of the present invention.
Figure 2:
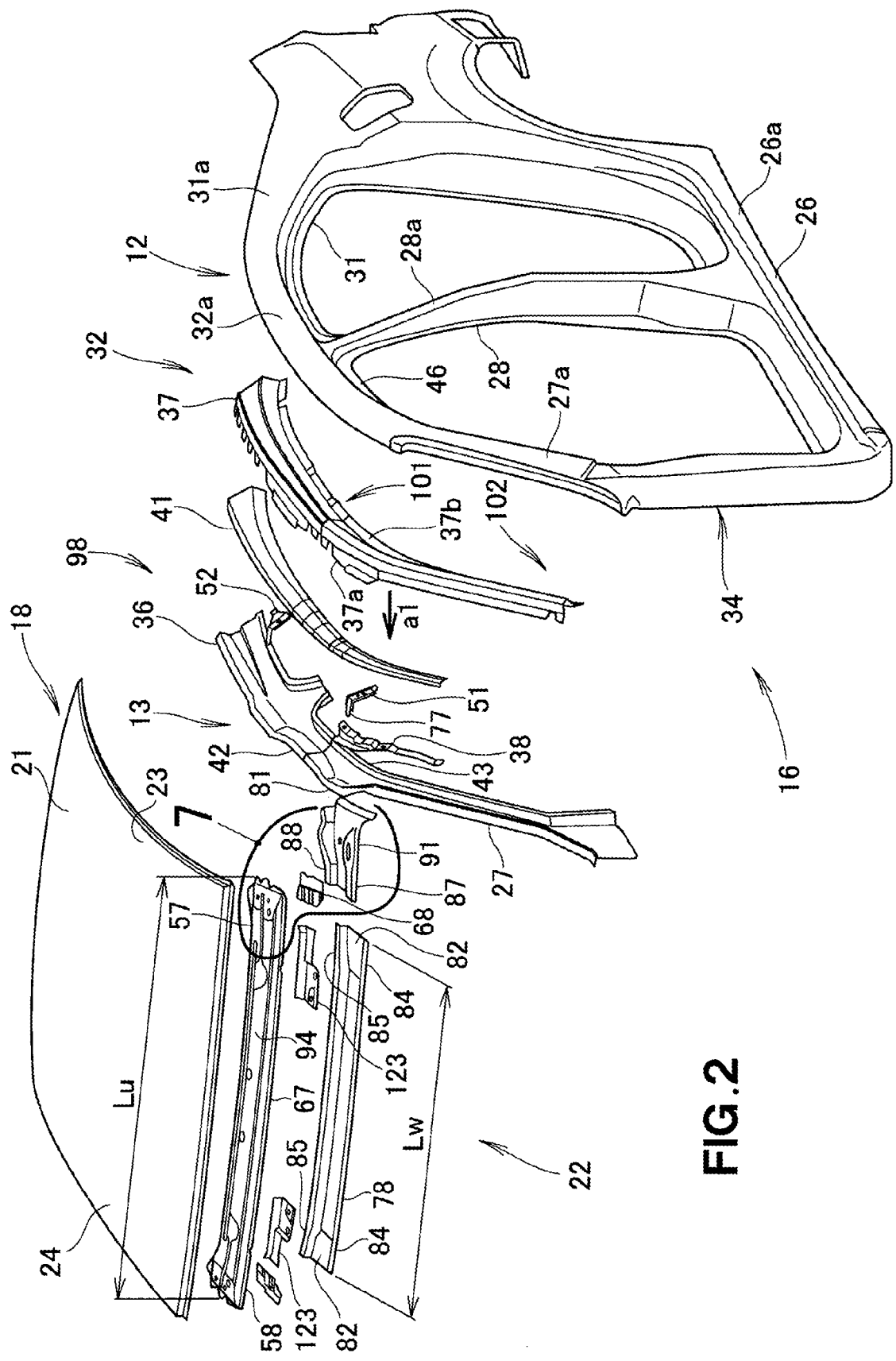
FIG. 2 is an exploded view of the vehicle body shown in FIG. 1.

As shown in FIG. 1 and FIG. 2, a vehicle body upper structure 13 according to an embodiment 1 is employed in a vehicle body 12. The vehicle body 12 includes left and right sides (side bodies) 16, 17 defining left and right walls of a vehicle compartment 15, and a roof 18.

The roof 18 includes a roof panel 21, and a front rail assembly 22 defining a front portion of the roof 18. The roof panel 21 has roof panel side portions 23, 24 joined to the left and right sides 16, 17.

The vehicle body lateral sides 16, 17 include lower side sills 26, front pillars 27, center pillars 28, rear pillars 31 and upper side rails 32.

The side sills 26, the front pillars 27, the center pillars 28, the rear pillars 31, and the side rails 32 have side sill outer panels 26a, front pillar outer panels 27a, center pillar outer panels 28a, rear pillar outer panels 31a, and side rail outer portions 32a, respectively, all of which are integral with one another to form side outer panels 34.

Each of the side rails 32 includes a side rail inner member 36, the side rail outer portion 32a, a side rail stiffener 37, an inner reinforcement member 38, and an outer reinforcement member 41, as shown in FIGS. 2, 3, 5 and 6. It is noted that the side rail outer portion 32a, the side rail stiffener 37 and the outer reinforcement member 41 are removed from FIG. 6.

In the side rail 32, the side rail inner member 36 has upper and lower flange portions 42, 43 joined through the side rail stiffener 37 to upper and lower flange portions 45, 46, respectively.

Figure 4:
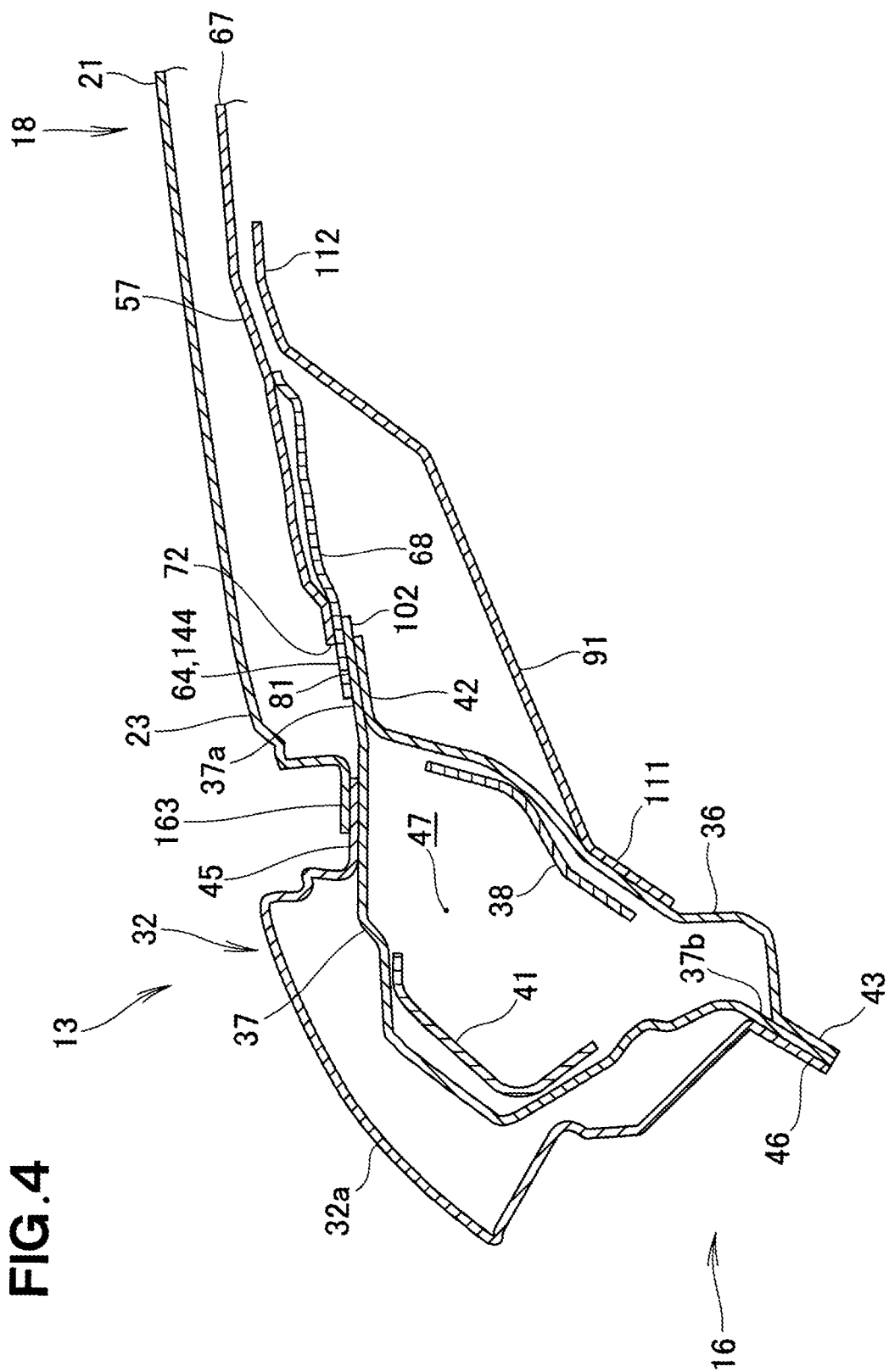
FIG. 4 is a cross-sectional view taken along line 4-4 of FIG. 1.

The side rail inner member 36 and the side rail stiffener 37 define a closed cross-sectional shape having a hollow space 47 (FIG. 4). Within the hollow space 47 are disposed the inner reinforcement member 38, the outer reinforcement member 41, a front stay 51 and a rear stay 52.

The left and right sides 16, 17 are symmetrically arranged about a center of a width of the vehicle body 12.

The roof 18 has a front one end portion 54 (FIG. 1) joined to the left side 16, and a front opposite end portion (FIG. 1) joined to the right side 17.

As shown in FIG. 1, the vehicle body upper structure 13 includes the left and right side rails 32 disposed at upper parts of the left and right sides 16, 17 and extending longitudinally of the vehicle body 12. The vehicle body upper structure 13 also includes the front rail 22 extending laterally of the vehicle body and having one end 57 joined to the left side rail 32 and an opposite end 58 joined to the right side rail 32. The front rail 22 has a predetermined width extending longitudinally of the vehicle body 12.

Figure 5:
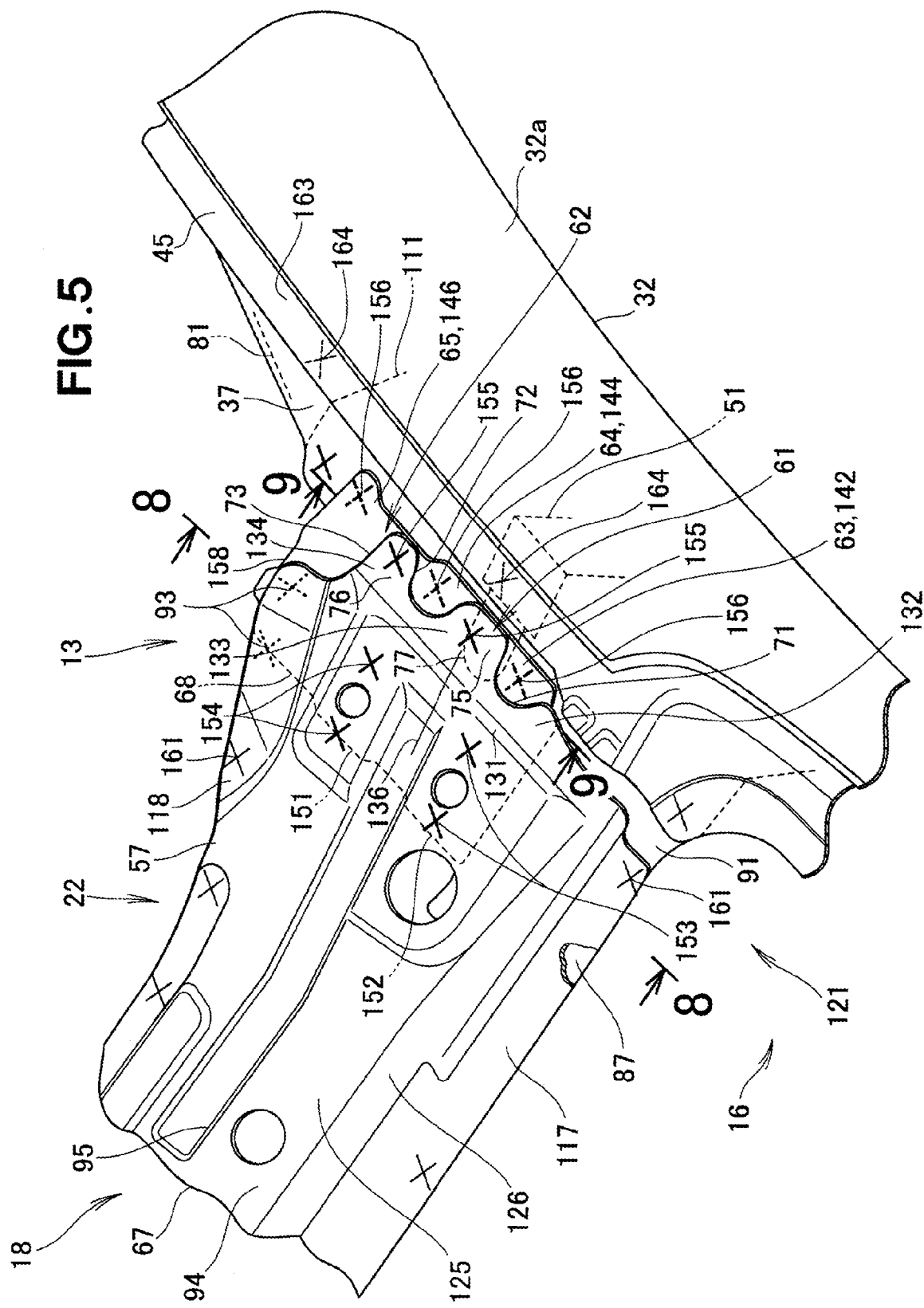
FIG. 5 is a perspective view of a state in which a side rail and a front rail shown in FIG. 1 are coupled to each other.
Figure 6:
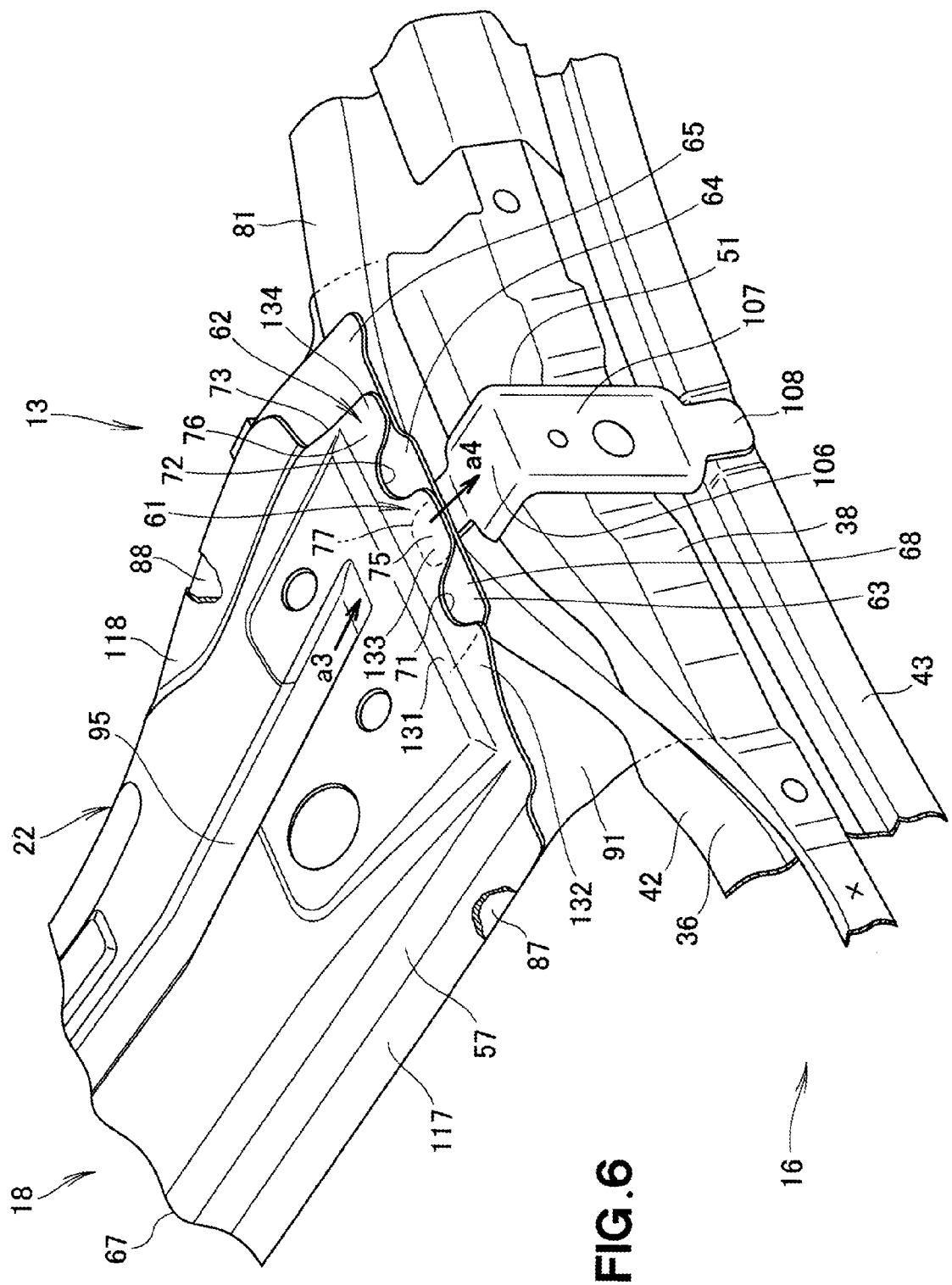
FIG. 6 is a perspective view of a state in which the side rail, the front rail and a stay are coupled together.

As shown in FIGS. 5 and 6, at least one of the one end 57 and the opposite end 58 has thick plate portions 61, 62 and thin plate portions 63, 64, 65 smaller in thickness than the thick plate portions 61, 62. The thick plate portions 61, 62 and the thin plate portions 63, 64, 65 are arranged longitudinally of the vehicle body 12. The thin plate portions 63, 64, 65 are joined to the left and right side rails 32.

Figure 9:
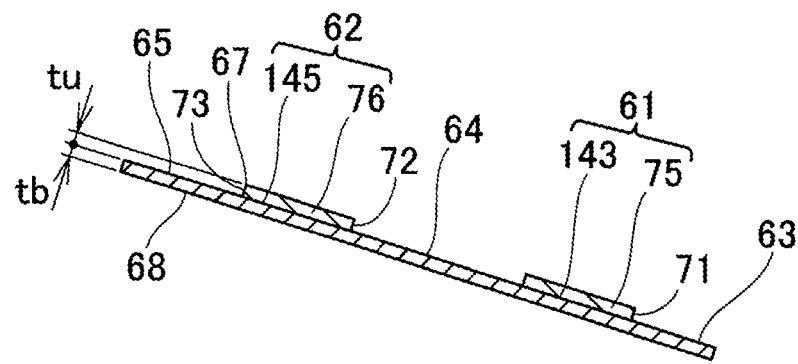
FIG. 9 is an enlarged cross-sectional view taken along line 9-9 of FIG. 5.

The front rail 22 includes a plate-shaped front rail upper member 67 having the one end 57 and the opposite end 58, and a plate-shaped bracket 68 coupled to the one end 57 or the opposite end 58. The bracket 68 has a thickness (tb) smaller than a thickness to (FIGS. 3 and 9) of the front rail upper member 67.

The one end 57 or the opposite end 58 of the front rail upper member 67 includes first, second and third cutout portions 71, 72, 73 matching the thin plate portions 63, 64, 65, respectively.

The bracket 68 overlaps the one end 57 or the opposite end 58 and includes first, third and fifth welded portions 142, 144, 146 which are exposed through the first, second and third cutout portions 71, 72, 73, respectively. The thin plate portions 63, 64, 65 define the first, third and fifth welded portions 142, 144, 146. The front rail upper member 67 includes remaining portions 75, 76 where the first, second and third cutout portions 71, 72, 73 are formed. These remaining portions 75, 76 and the bracket 68 overlap to thereby form the thick plate portions 61, 62.

Figure 3:
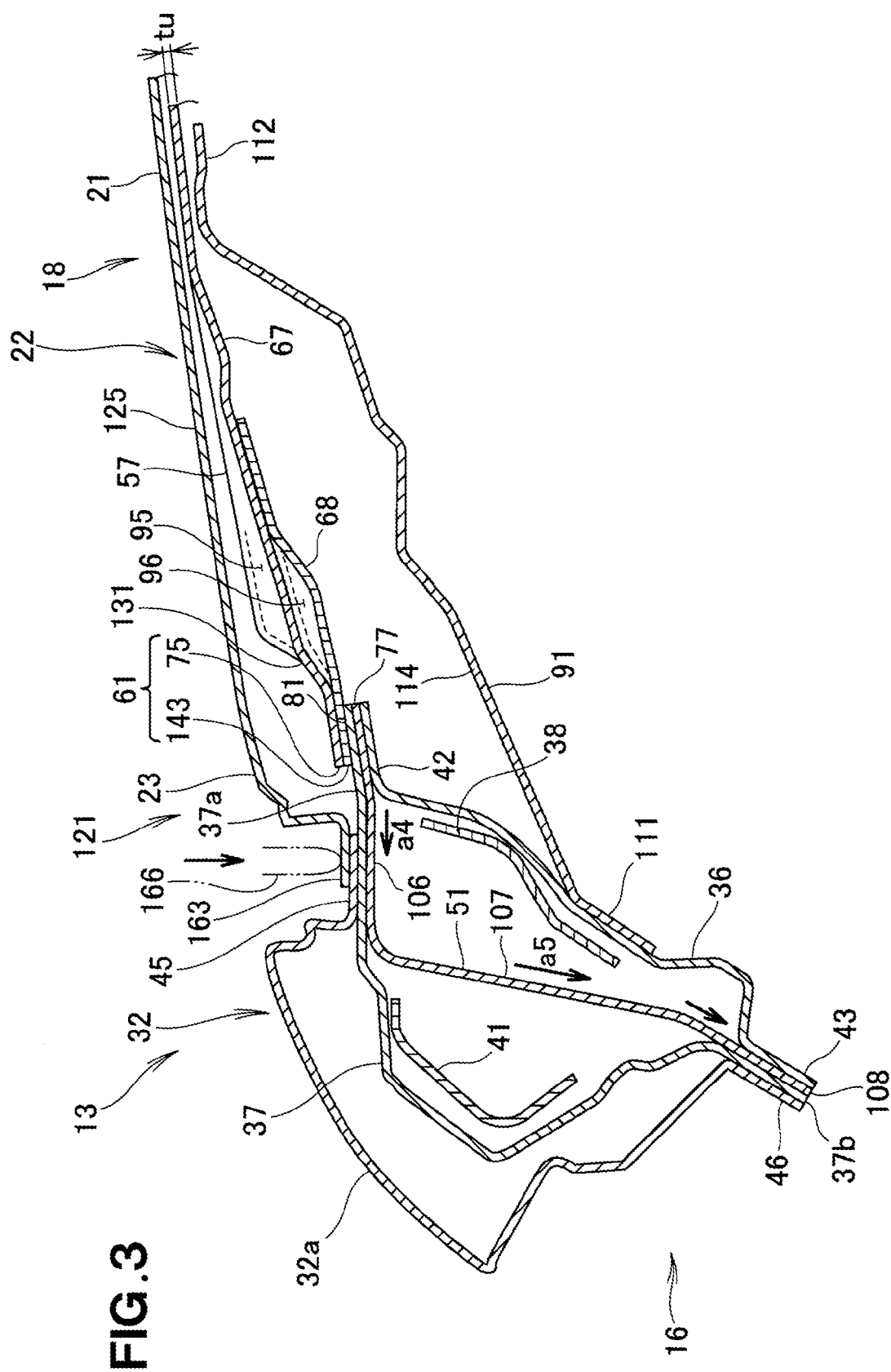
FIG. 3 is a cross-sectional view taken along line 3-3 of FIG. 1.

As shown in FIG. 3, the side rail 32 includes the side rail inner member 36, the side rail stiffener 37 brought into an overlapping relationship with the side rail inner member 36 (in a direction of an arrow a1) and coupled to an outside of the side rail inner member 36 to define a closed cross-sectional shape, and a front stay 51 disposed between the side rail inner member 36 and the side rail stiffener 37. The front stay 51 includes a stay upper portion 77, and the stay upper portion 77 and the thick plate portion 61 are vertically arranged in an overlapping relationship with each other.

As shown in FIGS. 2, 3 and 4, the front rail 22 includes a front rail lower member 78 disposed below the front rail upper member 67. The front rail lower member 78 has a length Lw defined as a dimension extending laterally of the vehicle body 12. The length Lw is smaller than a length Lu of the front rail upper member 67. The side rails 32 have carrier portions 81 extending longitudinally of the vehicle body 12 and projecting toward the center of the width of the vehicle body 12. The carrier portions 81 carry the one end 57 and the opposite end 58 thereon.

An extension 91 extends from the side rail 32 toward the center of the width of the vehicle body 12 more than the carrier portion 81. The front rail lower member 78 includes a lateral outer end portion 82 having front and rear flanges 84, 85 carried on front and rear flange portions 87, 88 (FIG. 7) of the extension 91, such that the front rail lower member 78 is supported on the extension 91.

Figure 7:
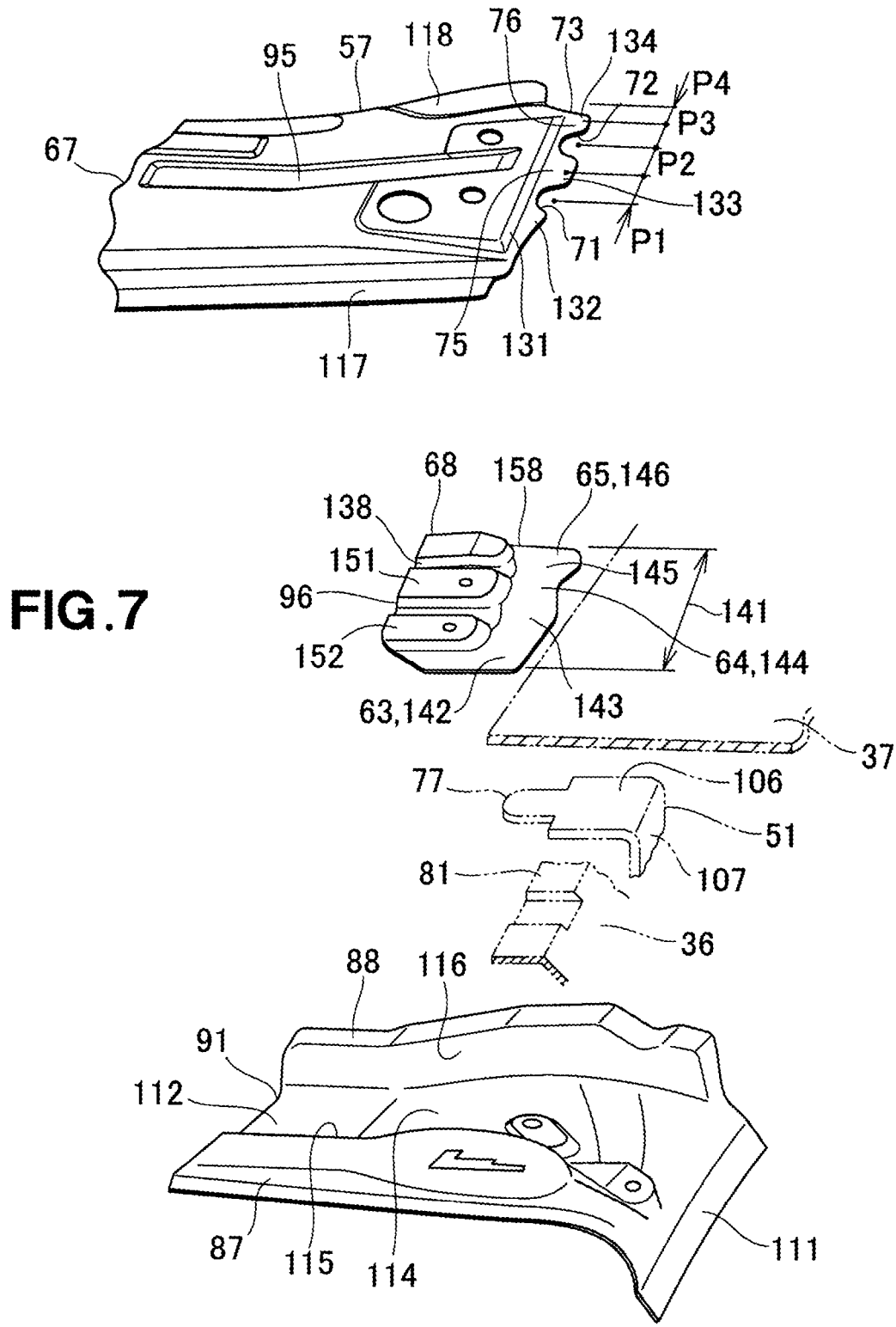
FIG. 7 is an enlarged view of a region 7 of FIG. 2, showing in perspective a front rail upper member, a bracket and an extension.
Figure 8:
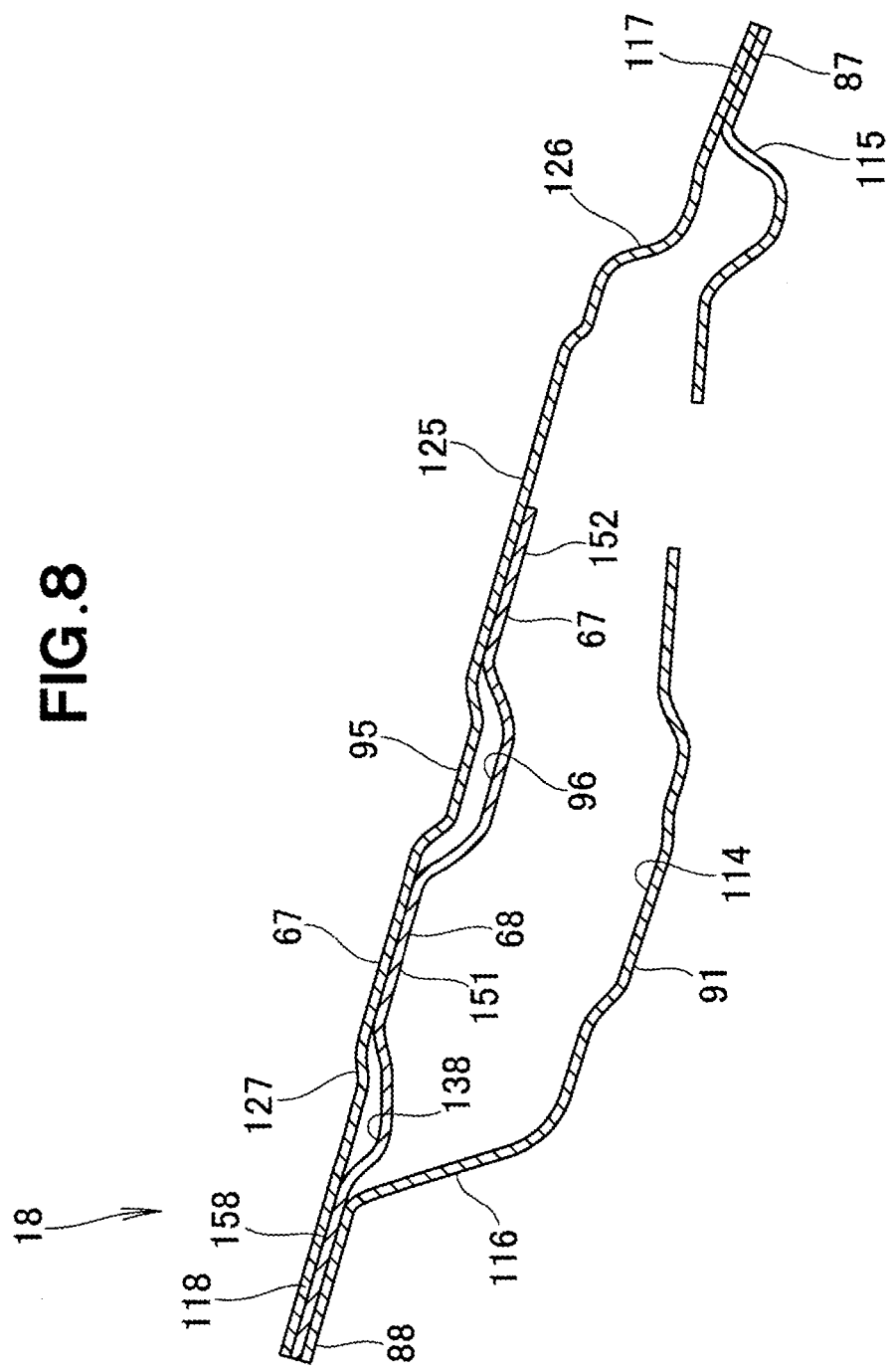
FIG. 8 is an enlarged cross-sectional view taken along line 8-8 of FIG. 5.

The bracket 68 is disposed between the extension 91 and the front rail upper member 67 and coupled at welds 93 to the front rail upper member 67 and the rear flange portion 88 of the extension 91 in an overlapping relationship with the front rail upper member 67 and the rear flange portion 88, as shown in FIGS. 5, 7 and 8.

The thick plate portions 61, 62 are arranged longitudinally of the vehicle body 12, and the thin plate portions 63, 64, 65 are arranged longitudinally of the vehicle body 12.

The front rail upper member 67 includes an upper bead 95 extending laterally of the vehicle body 12, i.e., longitudinally of a body 94 of the front rail upper member 67. The bracket 68 includes a bracket bead 96 extending along the upper bead 95, and the bracket 68 and the upper bead 95 are arranged vertically in an overlapping relationship with each other. The upper bead 95 extends toward the thick plate portion 61, as indicated by an arrow a3 of FIG. 6.

Next, a detailed discussion is made as to the vehicle body upper structure 13 in the embodiment 1. As shown in FIG. 2, the vehicle body upper structure 13 includes an uncompleted side rail 98 and the front rail 22 of the roof 18.

The uncompleted side rail 98 is an assembly to be joined to the roof panel 21 and the side rail outer portion 32a. The uncompleted side rail 98 includes an upper side rail inner assembly 101 to be attached to the roof 18, and a lower side rail inner assembly 102 extending downwardly and contiguous with the upper side rail inner assembly 101.

More specifically, the uncompleted side rail 98 includes the side rail inner member 36, the front stay 51, the rear stay 52, the inner reinforcement member 38, the outer reinforcement member 41, the side rail stiffener 37, and the extension 91 joined to the side rail inner member 36 and the roof 18. The bracket 68 is not included in the uncompleted side rail 98.

In the uncompleted side rail 98, as shown in FIGS. 2 to 4, the side rail stiffener 37 is joined to the side rail inner member 36. More specifically, the side rail stiffener 37 has an upper flange 37a and a lower flange 37b overlapping and joined to the upper flange portion 42 and the lower flange portion 43, respectively.

In the uncompleted side rail 98, also, the inner reinforcement member 38 overlaps and is joined to the side rail inner member 36.

The outer reinforcement member 41 overlaps and is joined to the side rail stiffener 37. As shown in FIG. 3, the front stay 51 is disposed between the inner reinforcement member 38 and the outer reinforcement member 41.

As shown in FIGS. 2, 3 and 6, the front stay 51 is L-shaped and has the stay upper portion 77 carried on the side rail inner member 36. The front stay 51 also has a roof backup 106 contiguous with the stay upper portion 77 and contacting an inner surface of the side rail stiffener 37. The front stay 51 includes a vertical portion 107 extending downwardly from the roof backup 106. The front stay 51 further includes a stay lower portion 108 contiguous with the vertical portion 107.

The stay lower portion 108 and the stay upper portion 77 are sandwiched between and joined to the side rail inner member 36 and the side rail stiffener 37. The stay upper portion 77 overlaps and is joined through the side rail stiffener 37 to the left one end 57 of the laterally extending front rail 22, as shown in FIG. 3. Although not shown, the right end 58 is joined through the side rail stiffener 37 to the stay upper portion 77 in an overlapping relationship with the stay upper portion 77.

The ends 57, 58 of the front rail 22 are carried on and coupled to the extension 91 of the uncompleted side rail 98.

The extension 91 has one end 111 joined to the side rail inner member 36, and an opposite end 112 joined to the front rail 22, as shown in FIGS. 2 to 4 and 6 to 8.

That is, the extension 91 includes a bottom portion 114 formed from the side rail joined portion 111 to the front rail joined portion 112. The extension 91 further includes front and rear side portions 115, 116 contiguous with the bottom portion 114. The front side portion 115 defines the front flange portion 87, and the rear side portion 116 defines the rear flange portion 88. The front flange portion 87 and the rear flange portion 88 are joined to the front flange 84 and the rear flange 85 of the front rail lower member 78. The extension 91 is located at an intersection 121 (FIG. 3) where the uncompleted side rail 98 and the front rail assembly 22 intersect in the form of a T-shaped butt joint.

The front rail assembly 22 includes the front rail upper member 67, the front rail lower member 78, the bracket 68 and a rail reinforcement member 123.

The front rail upper member 67 extends from the left side rail inner member 36 to the right side rail inner member 36 with the one end 57 and the opposite end 58 being joined to the one end 57 and the opposite end 58, respectively. The front rail upper member 67 includes a top portion 125, an upper front wall 126 and an upper rear wall 127 which define a U-shaped closed cross-sectional shape, as shown in FIG. 8. The upper front wall 126 and the upper rear wall 127 are contiguous with a front upper flange portion 117 and a rear upper flange portion 118, respectively. The one end 57 and the opposite end 58 are in a generally symmetrical relationship with each other, and hence discussion below is made as to the one end 57 only.

As shown in FIG. 7, the one end 57 of the front rail upper member 67 includes a sidewall 132 contiguous with the top portion 125 (FIG. 8), and one end flange 132 contiguous with the sidewall 132. The one end flange 132 defines the first cutout portion 71, a central weld 133, the second cutout portion 72, a rear end weld 134 and the third cutout portion 73 which are arranged in order from a front side of the front rail upper member 67. The first cutout portion 71 and the central weld 133 are located at a predetermined interval p1, the central weld 133 and the second cutout portion 72 are located at a predetermined interval p2, the second cutout portion 72 and the rear end weld 134 are located at a predetermined interval p3, and the rear end weld 134 and the third cutout portion 73 are located at a predetermined interval p4.

That is, the one end flange 132 extends along the side rail inner member 36, and the central weld 133 is located centrally of the one end flange 132. The first cutout portion 71 is located forwardly of the central weld 133, and the second cutout portion 72 is located rearwardly of the central weld 133. The rear end weld 134 is spaced rearwardly from the central weld 133 by a predetermined distance. The third cutout portion 73 is located rearwardly of the rear end weld 134.

The front rail upper member 67 has the upper bead 95 formed on the top portion 125. The upper bead 95 is a channel recessed toward the front rail lower member 78, and extends along a longitudinal center of the front rail upper member 67.

An extension line 136 (FIG. 5) extending from the upper bead 95 passes through or near the central weld 133, when viewed from above (FIGS. 5 and 6). The front rail upper member 67 has the length Lu (FIG. 2) larger than the length Lw of the front rail lower member 78. The front rail upper member 67 has the thickness tu (FIG. 3) along the entire length from the one end 57 to the opposite end 58. Attached to the one end 57 is the bracket 68 having a thickness smaller than the thickness tu.

As shown in FIG. 7, the bracket 68 includes a bracket bead 96 formed centrally thereof, another bracket bead 138 formed along the bracket bead 96, and a remaining portion 141 made of a blank material.

The remaining portion 141 of the blank material includes the exposed first welded portion 142, a second welded portion 143, the exposed third welded portion 144, a fourth welded portion 145 and the exposed fifth welded portion 146 which are arranged at predetermined intervals in order from a front side of the remaining portion 141. That is, the first welded portion 142, the third welded portion 144, and the fifth welded portion 146 are defined by the thin plate portions 63, 64, 65 of the front rail (front rail assembly) 22.

As shown in FIG. 2, the front rail lower member 78 is U-shaped in cross-section. The rail reinforcement member 123 is disposed between the front rail lower member 78 and the front rail upper member 67. The rail reinforcement member 123 is located at opposing ends of the lower rail lower member 78 and sandwiched between and joined to the front and rear flanges 84, 85 and the front and rear upper flange portions 117, 118.

Next, a brief discussion is made as to how to assemble the vehicle body upper structure 13 and spot-welding. As shown in FIG. 2, initially, the uncompleted side rail 98 and the front rail assembly 22 are provided in advance. Second, the side outer panel 34 is joined to the uncompleted side rail 98 to thereby complete the side rail 32. Next, the front rail assembly 22 is joined to the completed side rail 32. Finally, the roof panel 21 is placed thereon.

As for the uncompleted side rail 98, the inner reinforcement member 38 is joined to the side rail inner member 36 by spot-welding (not shown). The outer reinforcement member 41 is joined to the side rail stiffener 37 by spot-welding (not shown).

Subsequently, the side rail stiffener 37 is joined to the side rail inner member 36. In so doing, the front stay 51 and the rear stay 52 are sandwiched between the upper flange portion 42 and the upper flange 37a and between the lower flange portion 43 and the lower flange 37b.

Thereafter, the upper flange 42 and the upper flange 37a are joined together by spot-welding (not shown). The lower flange portion 43 and the lower flange 37b are joined together by spot-welding (not shown). Then, the one end (side rail joined portion) 111 (FIG. 7) of the extension 91 is joined to the side rail inner member 36 to thereby form the uncompleted side rail 98.

As for the front rail 22, the bracket 68 is attached to the front rail upper member 67 (FIG. 3). In this regard, the bracket 68 is spot-welded at a central joined portion 151 (FIG. 5) and a front joined portion 152 to the top portion 125 of the front rail upper member 67, such that welds 153, 154 are formed.

The second welded portion 143 (FIG. 3) and the fourth welded portion 145 (FIG. 7) of the bracket 68 are spot-welded to the central weld 133 and the rear end weld 134 of the one end flange 132 of the front rail upper member 67, such that welds 155 (FIG. 5) are formed.

The thick plate portion 61 (FIG. 3) is formed by the second welded portion 143 of the bracket 68 overlapping the central weld 133 of the front rail upper member 67. The thick plate portion 62 is formed by the fourth welded portion 145 of the bracket 68 overlapping the rear end weld 134 of the front rail upper member 67. The thin plate portions 63, 64, 65 are the first, third and fifth welded portions 142, 144, 146 of the bracket 68.

After the uncompleted side rail 98 and the front rail 22 are provided in the manner discussed above, the side outer panel 34 is joined to the uncompleted side rail 98, thereby completing the side rail 32.

Next, the front rail 22 is carried on and joined to the completed side rail 32. In so doing, the lateral outer end portion 82 of the front rail lower member 78 is carried on the front rail joined portion 112 defining the opposite end of the extension 91, and each of the one end 57 and the opposite end 58 of the front rail upper member 67 is placed over the upper flange 37a of the side rail stiffener 37 and the upper flange portion 42 of the side rail inner member 36.

As shown in FIGS. 4 to 6, the upper flange portion 42 of the side rail inner member 36, the upper flange 37a of the side rail stiffener 37 and each of the first, third and fifth welded portions 142, 144, 146 overlap one another and are joined together by single-sided spot welding to thereby form welds 156.

The rear upper flange portion 118 of the front rail upper member 67, a rear joined portion 158 of the bracket 68, and the rear flange portion 88 of the extension 91 overlap one another and are spot-welded together to thereby form the welds 93. That is, the bracket 68, the extension 91 and the front rail upper member 67 overlap and are joined to one another to thereby form a "three-layered coupled part" (FIG. 8).

The front and rear flange portions 87, 88 of the extension 91 are spot-welded at welds 161 to the front and rear upper flange portions 117, 118 of the front rail upper member 67.

Finally, the roof panel 21 is carried on and joined to the side rail 32. More specifically, a roof flange portion 163 (FIG. 3) of the roof panel 21, the upper flange portion 45 of the side rail outer portion 32a, and the upper flange 37a of the side rail stiffener 37 overlap one another, and are pressed against the front and rear stays 51, 52 and coupled to the stays 51, 52 by single-sided spot-welding to thereby form welds 164.

Next, a discussion is made as to advantages of the vehicle body upper structure 13 in the embodiment 1. The vehicle body upper structure 13 has the advantage that the front rail 22 is sufficiently welded to the side rail 32 by means of the thin plate portions 63, 64, 65 (the first, third and fifth welded portions 142, 144, 146).

That is, when each of the thin plate portions 63, 64, 65 (the first, third and fifth welded portions 142, 144, 146) and the side rail 32 (i.e., an assembly of the side rail inner member 36 and the side rail stiffener 37 joined to the side rail inner member 36) overlap one another and are joined together (by single-sided spot welding), insufficient weld penetration is less likely to occur than when the thick plate portions 61, 62 are joined to the side rail. As a result, decrease in weld strength in the welded region (T-shaped butt joint) 121 can be prevented.

Further, since the front thick plate portion next to the thin plate portions 64, 65 (the third welded portion 144 (FIG. 7) and the fifth welded portion 146) or the rear thick plate portion next to the thin plate portions 63, 64 (the first welded portion 142 and the third welded portion 144) extends to the side rail 32 (the assembly of the side rail inner member 36 and the side rail stiffener 37 joined to the side rail inner member 36) in an overlapping relationship with the side rail 32, the intersection (T-shaped butt joint) 121 where the side rail 32 and the front rail 22 intersect can have increased rigidity and strength.

When a spot gun 166 (FIG. 3) exerts a downwardly-directed pressing force on vicinities of the thick plate portions 61, 62, i.e., on the roof panel 21 to perform single-sided spot welding on the roof panel 21, the force can be transmitted from the thick plate portions 61, 62 to the front stay 51, as indicated by an arrow a4 (see FIG. 6, too) and an arrow a5.

Embodiment 2

Figure 10:
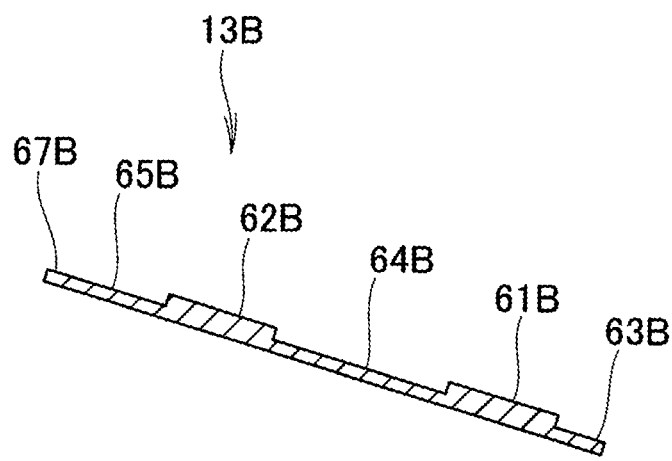
FIG. 10 is a cross-sectional view of a vehicle body upper structure in a second embodiment of the present invention, showing thick plate portions and thin plate portions in correspondence to FIG. 9.

Next, a vehicle body upper structure 13B in an embodiment 2 is discussed with reference to FIG. 10. FIG. 10 corresponds to FIG. 9. A discussion of the same elements of the vehicle body upper structure 13B as those of the vehicle body upper structure 13 in the embodiment 1 shown in FIGS. 1 to 9 is omitted.

The vehicle body upper structure 13B in the embodiment 2 includes a front rail upper member 67B having thick plate portions 61B, 62B and thin plate portions 63B, 64B, 65B formed integrally with one another. More specifically, the front rail upper member 67B is made of a thick plate material, and the thick plate material is partially subjected to a machining operation (cutting or grinding) or recessed (through a plastic working), such that the thin plate portions 63B, 64B, 65B are formed on one end and an opposite end of the front rail upper member 67B. In this case, the thick plate portions 61B, 62B are portions which have not been subjected to the machining operation (cutting or grinding) or recessed (through the plastic working).

The vehicle body upper structure 13B in the embodiment 2 has the same advantages as those of the vehicle body upper structure 13 in the embodiment 1.

The vehicle body upper structure 13B in the embodiment 2 does not employ the bracket 68 overlapping the front rail upper member 67 to form the thick plate portions 61, 62 in the embodiment 1. By not employing the bracket 68, the thick plate portions 61B, 62B and the thin plate portions 63B, 64B, 65B are easy to manufacture because it is not necessary to perform a plastic working, a maintenance operation and a welding operation on the bracket 68.

Embodiment 3

Figure 11:
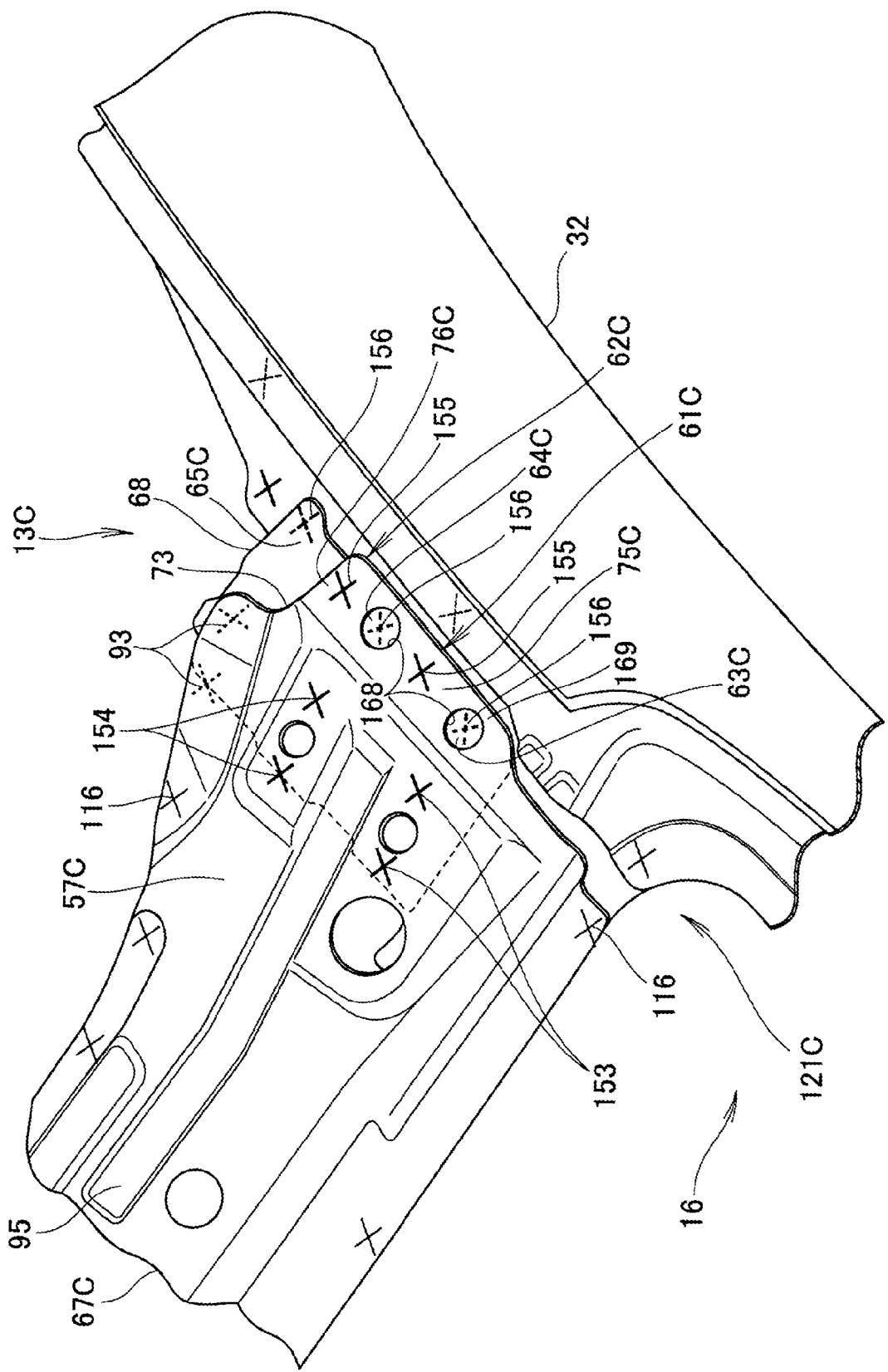
FIG. 11 is a perspective view of a vehicle body upper structure in a third embodiment of the present invention, corresponding to FIG. 5.

A vehicle body upper structure 13C in an embodiment 3 is discussed with reference to FIG. 11. FIG. 11 corresponds to FIG. 5. A discussion of the same elements of the vehicle body upper structure 13C as those of the vehicle body upper structure 13 in the embodiment 1 shown in FIGS. 1 to 9 is omitted.

The vehicle body upper structure 13C in the embodiment 3 includes a front rail upper member 67C having through-holes 168 at one end 57C or an opposite end located in a symmetrical relationship with the one end 57C. The through-holes 168 match thin plate portions 63C, 64C.

The bracket 68 overlaps the one end 57C or the opposite end, and includes exposure portions 63C, 64C exposed through the through-holes 168. The front rail upper member 67C includes remaining portions 75C, 76C where the through-holes 168 are not formed. The thick plate portions 61C, 62C are formed by an overlap between the remaining portions 75C, 76C and the bracket 68. The through-holes 168 have the least sizes allowing spot-welding to be performed on the thick plate portions 61C, 62C.

The vehicle body upper structure 13C in the embodiment 3 has the same advantages as those of the vehicle body upper structure 13 in the embodiment 1.

In the embodiment 3, unlike the cutout portions (the first and second cutout portions 71, 72) in the embodiment 1 arranged in a discontinuous manner, an edge 169 continuously extends to facilitate dispersion of a load applied thereto as well as to increase rigidity and strength of a T-shaped butt joint 121C.

The vehicle body upper structure 13 may have a plurality of brackets 68 stacked together to form the thick plate portions 61, 62 although the thick portions 61, 62 are formed by an overlap between the front rail upper member 67 and the single bracket 68.

INDUSTRIAL APPLICABILITY

The present invention is suitable for use in an automobile.

REFERENCE SIGNS LIST

11 . . . a vehicle, 13 . . . a vehicle body upper structure, 15 . . . a vehicle compartment, 16 . . . a left side (a side body), 17 . . . a right side (a side body), 22 . . . a front rail, 32 . . . left and right side rails, 36 . . . a side rail inner member, 37 . . . a side rail stiffener, 51 . . . a front stay, 57 . . . one end of the front rail, 58 . . . an opposite end of the front rail, 61,62 . . . thick plate portions, 63, 64, 65 . . . thin plate portions, 63C, 64C . . . exposure portions, 67 . . . a front rail upper member, 68 . . . a bracket, 71 . . . a first cutout portion, 72 . . . a second cutout portion, 73 . . . a third cutout portion, 75, 76 . . . remaining portions, 75C, 76C . . . remaining portions, 77 . . . a stay upper portion, 78 . . . a front rail lower member, 81 . . . a carrier portion, 82 . . . an outer end portion, 84 . . . a front flange, 85 . . . a rear flange, 91 . . . an extension, 94 . . . a body of the front rail upper member, 95 . . . an upper bead, 96 . . . a bracket bead, 168 . . . a through hole, Lu . . . a length of the front rail upper member, Lw . . . a length of the front rail lower member, tb . . . a thickness of the bracket, tu . . . a thickness of the front rail upper member.

The invention claimed is:

1. A vehicle body upper structure comprising:
left and right side rails disposed at upper parts of lateral sides of a vehicle body and extending in a longitudinal direction of the vehicle body; and
a front rail extending in a lateral direction of the vehicle body and having one end joined to the left side rail and an opposite end joined to the right side rail, the front rail having a predetermined width extending in the longitudinal direction of the vehicle,
wherein at least one of the one end and the opposite end of the front rail includes a thick plate portion and a thin plate portion, said thin plate portion having a thickness dimension that is smaller than a thickness dimension of said thick plate portion, the thick plate portion and the thin plate portion being arranged longitudinally of the vehicle body, and the thin plate portion being coupled to at least one of the left and right side rails,
wherein the front rail comprises a plate-shaped front rail upper member having the one end and the opposite end, and a plate-shaped bracket coupled to the one end or the opposite end, the bracket having a thickness dimension that is smaller than the thickness dimension of the front rail upper member,
wherein the one end or the opposite end has a cutout portion or through-hole formed to match the thin plate portion, wherein the bracket overlaps the one end or the opposite end and includes an exposure portion exposed through the cutout portion or the through-hole,
wherein the thin plate portion is defined by the exposure portion, and
wherein the front rail upper member includes a remaining portion where the cutout portion or the though-hole is not formed, the thick plate portion being formed by an overlap between the remaining portion and the bracket.

2. The vehicle body upper structure of claim 1, wherein each of the side rails comprises a side rail inner member, a side rail stiffener coupled to an outside of the side rail inner member in an overlapping relationship therewith to define a closed cross-sectional shape, and a stay disposed between the side rail inner member and the side rail stiffener,
wherein the stay includes a stay upper portion, the stay upper portion and the thick plate portion being vertically arranged in an overlapping relationship with each other.

3. The vehicle body upper structure of claim 1, wherein the front rail further comprises a front rail lower member disposed below the front rail upper member, the front rail upper member having a dimension extending laterally of the vehicle body, the front rail lower member having a dimension extending laterally of the vehicle body, the dimension of the front rail lower member being smaller than the dimension of the front rail upper member,
wherein the side rails include carrier portions protruding toward a center of a width of the vehicle body and extending longitudinally of the vehicle body, the carrier portions carrying the one end and the opposite end,
wherein the structure further comprises an extension protruding from each of the side rails toward the center of the width of the vehicle body more than each of the carrying portions, the front rail lower member having a lateral outer end portion carried on the extension such that the extension supports the front rail lower member, and
wherein the bracket is disposed between and coupled to the extension and the front rail upper member in an overlapping relationship with the extension and the front rail upper member.

4. The vehicle body upper structure of claim 1, wherein the thick plate portion is provided in plural, the plural thick plate portions being arranged longitudinally of the vehicle body, and the thin plate portion is provided in plural, the plural thin plate portions being arranged longitudinally of the vehicle body.

5. The vehicle body upper structure of claim 1, wherein the front rail upper member includes an upper bead extending longitudinally of the front rail upper member, and
wherein the bracket includes a bracket bead extending along the upper bead, the bracket bead and the upper bead being arranged vertically in an overlapping relationship with each other.

6. The vehicle body upper structure of claim 5, wherein the upper bead extends toward the thick plate portion.

* * * * *